(12) United States Patent
Kwon et al.

(10) Patent No.: US 10,953,798 B2
(45) Date of Patent: Mar. 23, 2021

(54) VEHICLE STATUS MANAGEMENT APPARATUS AND METHOD

(71) Applicants: HYUNDAI MOTOR COMPANY, Seoul (KR); KIA MOTORS CORPORATION, Seoul (KR)

(72) Inventors: Ki Beom Kwon, Seoul (KR); Jae Sun Han, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 5 days.

(21) Appl. No.: 16/515,147

(22) Filed: Jul. 18, 2019

(65) Prior Publication Data

US 2020/0317125 A1    Oct. 8, 2020

(30) Foreign Application Priority Data

Apr. 5, 2019  (KR) .................. 10-2019-0040257

(51) Int. Cl.
| | |
|---|---|
| *B60R 1/00* | (2006.01) |
| *G06K 11/04* | (2006.01) |
| *G06K 9/00* | (2006.01) |
| *B60R 11/04* | (2006.01) |
| *B60R 11/02* | (2006.01) |
| *B60R 11/00* | (2006.01) |

(52) U.S. Cl.
CPC ............ *B60R 1/00* (2013.01); *B60R 11/0247* (2013.01); *B60R 11/04* (2013.01); *G06K 9/00832* (2013.01); *B60R 2011/0036* (2013.01); *B60R 2300/8006* (2013.01)

(58) Field of Classification Search
None
See application file for complete search history.

(56) References Cited

U.S. PATENT DOCUMENTS

| | | | |
|---|---|---|---|
| 6,485,156 B1 | 11/2002 | Marshall | |
| 9,315,152 B1* | 4/2016 | Maestas | ............... B60R 25/305 |
| 2002/0115423 A1* | 8/2002 | Hatae | .................... G08B 25/08 |
| | | | 455/404.1 |
| 2018/0332389 A1* | 11/2018 | Ekkizogloy | ............ G10L 15/26 |

FOREIGN PATENT DOCUMENTS

| | | |
|---|---|---|
| KR | 10-2005-0026130 A | 3/2005 |
| KR | 10-2014-0034387 A | 3/2014 |
| KR | 20-2016-0000617 U | 2/2016 |

\* cited by examiner

*Primary Examiner* — John F Mortell
(74) *Attorney, Agent, or Firm* — Morgan, Lewis & Bockius LLP

(57) ABSTRACT

A vehicle status management apparatus includes: a sound detector that is disposed in an object storage compartment of a vehicle and that detects a sound generated in the object storage compartment; a camera that obtains an image by photographing an inside of the object storage compartment; a display disposed in the vehicle; and a controller that controls the display to display the image of the inside of the object storage compartment which is obtained through the camera when the sound is detected.

16 Claims, 9 Drawing Sheets

VEHICLE STATUS MANAGEMENT APPARATUS AND METHOD

CROSS-REFERENCE TO RELATED APPLICATION

This application claims the benefit of priority to Korean Patent Application No. 10-2019-0040257, filed in the Korean Intellectual Property Office on Apr. 5, 2019, the entire contents of which are incorporated herein by reference.

TECHNICAL FIELD

The present disclosure relates to a vehicle status management apparatus and method.

BACKGROUND

A trunk of a vehicle is a storage compartment for storing various types of devices and goods. When a sound is generated in the trunk, a user in the vehicle cannot check the inside of the trunk. Therefore, the user has the inconvenience of having to get out of the vehicle, open the trunk, and directly check the inside of the trunk. Furthermore, in the case where a sound is generated in the trunk during travel of the vehicle, the sound is stopped when the vehicle comes to rest, and therefore, the user has difficulty identifying a cause of the sound.

SUMMARY

The present disclosure has been made to solve the above-mentioned problems occurring in the prior art while advantages achieved by the prior art are maintained intact.

An aspect of the present disclosure provides a vehicle status management apparatus and method for photographing and displaying the inside of an object storage compartment of a vehicle when a sound is generated in the object storage compartment of the vehicle.

The technical problems to be solved by the present disclosure are not limited to the aforementioned problems, and any other technical problems not mentioned herein will be clearly understood from the following description by those skilled in the art to which the present disclosure pertains.

According to an exemplary embodiment of the present disclosure, a vehicle status management apparatus includes: a sound detector that is disposed in an object storage compartment of a vehicle and that detects a sound generated in the object storage compartment; a camera that obtains an image by photographing an inside of the object storage compartment; a display disposed in the vehicle; and a controller that controls the display to display the image of the inside of the object storage compartment, which is obtained through the camera, when the sound is detected.

The controller may receive, from the camera, a first image obtained before the detection of the sound and a second image obtained after the detection of the sound and may analyze a cause area where the sound is generated, by comparing the first image and the second image.

The controller may control the display to highlight the cause area in the obtained image of the inside of the object storage compartment.

The controller may control the display to enlarge and display the cause area in the obtained image of the inside of the object storage compartment.

The controller may control the display to blur the remaining area other than the cause area in the obtained image of the inside of the object storage compartment.

The vehicle status management apparatus may further include a lighting device disposed in the object storage compartment, and the controller may control the lighting device to adjust a lighting direction or a lighting range to light only the cause area.

The sound detector may include a plurality of microphones, and the controller may analyze a cause area where the sound is generated, based on whether each of the plurality of microphones detects a sound.

The controller may determine an area adjacent to a position of a microphone that detects a sound, among the plurality of microphones, as the cause area.

The controller may control a photographing direction of the camera to be directed toward the cause area.

The controller may analyze the cause area where the sound is generated, in consideration of intensity of a sound detected through each of the plurality of microphones.

According to another exemplary embodiment of the present disclosure, a vehicle status management method includes: detecting a sound generated in an object storage compartment of a vehicle; obtaining an image of the inside of the object storage compartment; and controlling displaying of the image obtained by photographing an inside of the object storage compartment.

The obtaining of the image of the inside of the object storage compartment may include obtaining a first image by photographing the inside of the object storage compartment before the detection of the sound and obtaining a second image by photographing the inside of the object storage compartment after the detection of the sound.

The controlling of displaying the obtained image may include analyzing a cause area where the sound is generated in the object storage compartment, by comparing the first image and the second image, and controlling the cause area to be highlighted in the obtained image.

The controlling of the cause area to be highlighted may include controlling the cause area to be enlarged and displayed in the obtained image.

The controlling of the cause area to be highlighted may include controlling the remaining area other than the cause area to be blurred and displayed in the obtained image.

The vehicle status management method may further include controlling a lighting direction to be directed toward the cause area, after the analyzing of the cause area and obtaining a third image by photographing the inside of the object storage compartment, after the controlling of the lighting direction.

The detecting of the sound may include detecting sounds through a plurality of microphones disposed at different positions in the object storage compartment.

The controlling of displaying the obtained image may include analyzing a cause area where the sound is generated in the object storage compartment, based on whether each of the plurality of microphones detects a sound and controlling the cause area to be highlighted in the obtained image.

The analyzing of the cause area may include determining an area adjacent to a position of a microphone that detects a sound, among the plurality of microphones, as the cause area.

The vehicle status management method may further include controlling a photographing direction of a camera to be directed toward the cause area, after the analyzing of the cause area.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
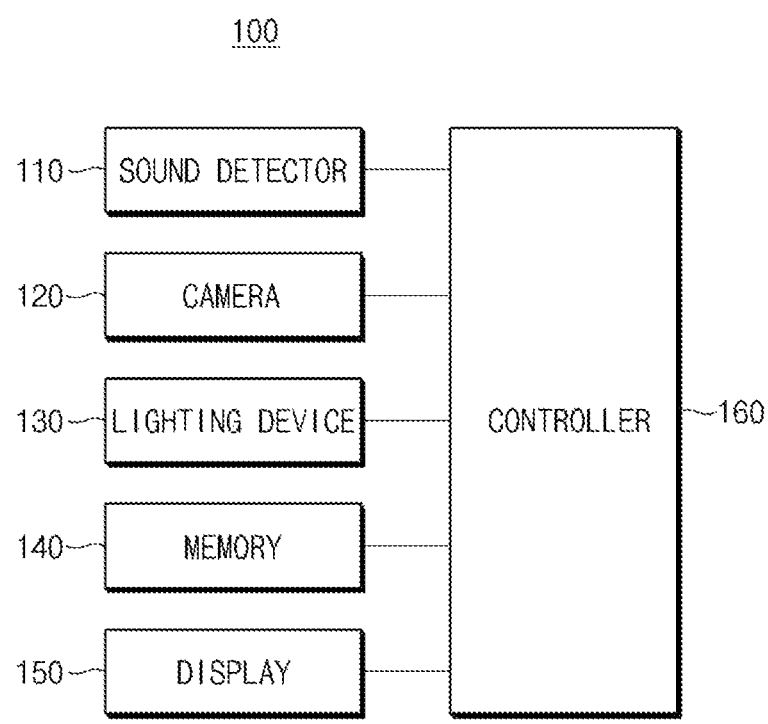
FIG. 1 is a block diagram illustrating a vehicle status management apparatus according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a vehicle status management apparatus according to an exemplary embodiment of the present disclosure.

Referring to FIG. 1, the vehicle status management apparatus 100 includes a sound detector 110, a camera 120, a lighting device 130, a memory 140, a display 150, and a controller 160.

The sound detector 110 is disposed in an object storage compartment (e.g., a trunk) of a vehicle and detects a sound generated in the object storage compartment. The sound detector 110 detects the sound through one, two or more microphones installed in the object storage compartment. When two or more microphones are disposed in the object storage compartment, the microphones may be disposed at different positions in the object storage compartment.

The camera 120 is disposed in the object storage compartment of the vehicle and photographs the inside of the object storage compartment. The camera 120 outputs, to the controller 160, an image obtained by photographing the inside of the object storage compartment. The cameras 120 may include at least one image sensor among image sensors such as a charge coupled device (CCD) image sensor, a complementary metal oxide semiconductor (CMOS) image sensor, a charge priming device (CPD) image sensor, and a charge injection device (CID) image sensor. The cameras 120 may include an image processor that performs image processing, such as noise removal, color reproduction, file compression, image quality adjustment, and color saturation adjustment, on images obtained through the at least one image sensor. Furthermore, the camera 120 may include an actuator that adjusts a camera angle. That is, the camera 120 may adjust a photographing direction by adjusting the camera angle according to an instruction of the controller 160.

When no photographing instruction is received from the controller 160 for a predetermined period of time, the camera 120 enters a sleep mode from an active mode. When receiving a photographing instruction from the controller 160 in the sleep mode, the camera 120 wakes up in the sleep mode and switches to the active mode. In the active mode, the camera 120 photographs the inside of the object storage compartment.

The lighting device 130 is installed in the object storage compartment of the vehicle and includes one or more light sources. Here, the light sources may be implemented with light emitting diodes, incandescent lamps, fluorescent lamps, or halogen lamps. Furthermore, the lighting device 130 may include an actuator for adjusting a lighting direction and/or a lighting range.

The memory 140 may store a program for an operation of the controller 160 and may temporarily store input and/or output data. The memory 140 may store an image processing algorithm and a sound generation place analysis algorithm. The memory 140 may store images taken with the camera 120.

The memory 140 may be implemented with at least one storage medium (recording medium) among storage media such a flash memory, a hard disk, a secure digital (SD) card, an random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, and web storage.

The display 150 displays a progress status and an outcome according to an operation of the controller 160. The display 150 may include an image processor that processes and outputs an image obtained through the camera 120, that is, an image of the inside of the object storage compartment. The display 150 may be implemented with one or more of a liquid crystal display (LCD), a thin film transistor-liquid crystal display (TFT LCD), an organic light-emitting diode (OLED) display, a flexible display, a three-dimensional (3D) display, a transparent display, a head-up display (HUD), and a touch screen.

The display 150 may include an audio output device, such as a speaker, which outputs audio data. Furthermore, the display 150 may be implemented with a touch screen combined with a touch sensor and may be used as an input device as well as an output device.

The controller 160 controls an overall operation of the vehicle status management apparatus 100. The controller 160 may include at least one of an application specific integrated circuit (ASIC), a digital signal processor (DSP), programmable logic devices (PLDs), field programmable gate arrays (FPGAs), a central processing unit (CPU), microcontrollers, and microprocessors. The controller 160 may be an electronic control unit (ECU).

The controller 160 detects, through the sound detector 110, a sound generated in the object storage compartment. In other words, the controller 160 may detect the sound generated in the object storage compartment, through the one or more microphones disposed in the object storage compartment.

The controller 160 may obtain a first image by photographing the inside of the object storage compartment by operating the camera 120 before detecting, through the sound detector 110, the sound generated in the object storage compartment. Furthermore, the controller 160 may obtain a second image by photographing the inside of the object storage compartment through the camera 120 after detecting, through the sound detector 110, the sound generated in the object storage compartment. At this time, the camera 120 may output the first image to the controller 160 immediately after obtaining the first image, or may output the first image and the second image together to the controller 160 after obtaining the second image. The controller 160 may store, in the memory 140, the first image and the second image that are obtained from the camera 120.

The controller 160 may compare the first image obtained before the detection of the sound and the second image obtained after the detection of the sound and may analyze a predetermined range based on a cause area where the sound is generated, that is, a sound generation place (a position where the sound is generated).

The controller 160 controls the display 150 to highlight the cause area in the second image. The display 150 displays, on a screen, the second image in which the cause area is highlighted according to the control of the controller 160. For example, the controller 160 controls the display 150 to enlarge and display the cause area in the second image. Alternatively, the controller 160 controls the display 150 to blur the remaining area other than the cause area in the second image.

When the cause area is identified, the controller 160 controls the lighting device 130 such that a lighting direction is directed toward the cause area. That is, the controller 160 controls the lighting device 130 such that the lighting direction is directed toward the place where the sound is generated in the object storage compartment. At this time, the controller 160 may control the lighting device 130 to light only an area corresponding to the cause area by adjusting a lighting range. After adjusting the lighting direction, the controller 160 obtains a third image by photographing the inside of the object storage compartment through the camera 120. The controller 160 outputs the obtained third image on the display 150. At this time, the controller 160 may control the display 150 to highlight the cause area in the third image.

When the controller 160 detects a sound through two or more microphones disposed at different positions in the object storage compartment, the controller 160 may analyze a cause area where the sound is generated in the object storage compartment, based on whether each of the microphones detects the sound. The controller 160 may determine an area adjacent to the position of a microphone that detects the sound, among the two or more microphones, as the cause area. Alternatively, the controller 160 may track the cause area in consideration of the intensity of a sound received through each microphone. At this time, the controller 160 may estimate (track) the cause area where the sound is generated in the object storage compartment, by using any one of well-known technologies for analyzing (tracking) a cause area of a sound (a sound generation place).

The controller 160 may control a camera angle such that the photographing direction of the camera 120 is directed toward the cause area. For example, the controller 160 may perform control such that the photographing direction of the camera 120 is directed toward the position of a microphone that detects the sound. Next, the controller 160 obtains an image by photographing the inside of the object storage compartment through the camera 120 and outputs the image on the display 150. At this time, the controller 160 highlights the cause area in the obtained image on the display 150.

Figure 2:
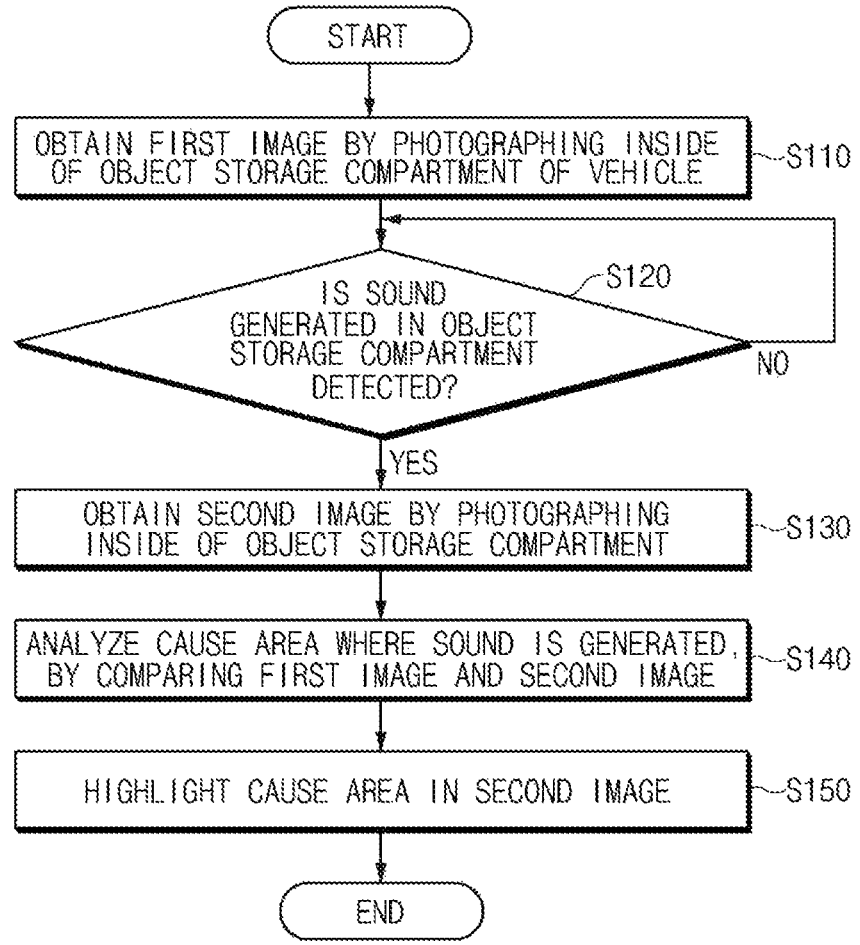
FIG. 2 is a flowchart illustrating a vehicle status management method according to an exemplary embodiment of the present disclosure.
Figure 3A:
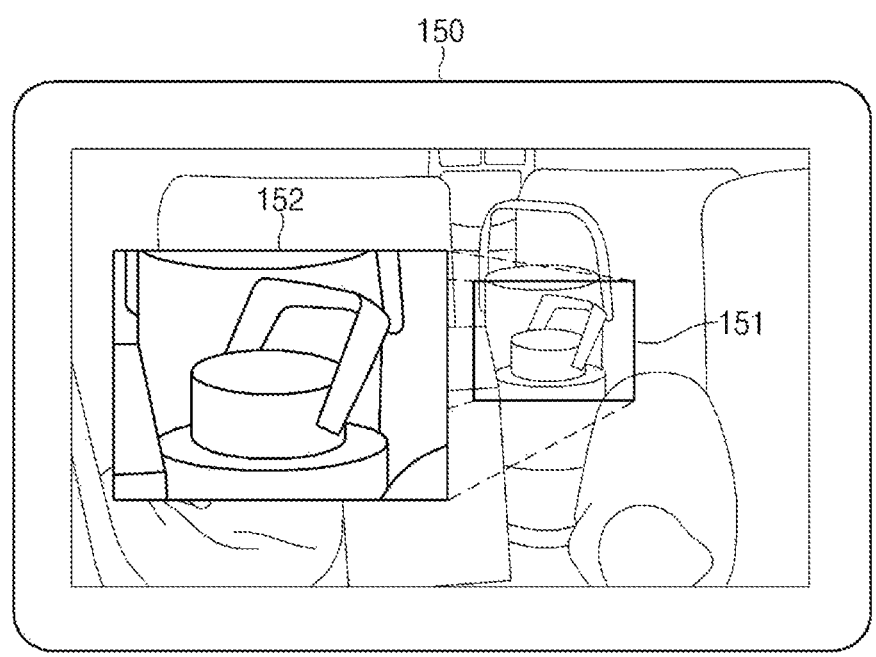
FIGS. 3A and 3B are exemplary views illustrating examples of displaying an image of an object storage compartment of a vehicle according to an exemplary embodiment of the present disclosure.
Figure 3B:
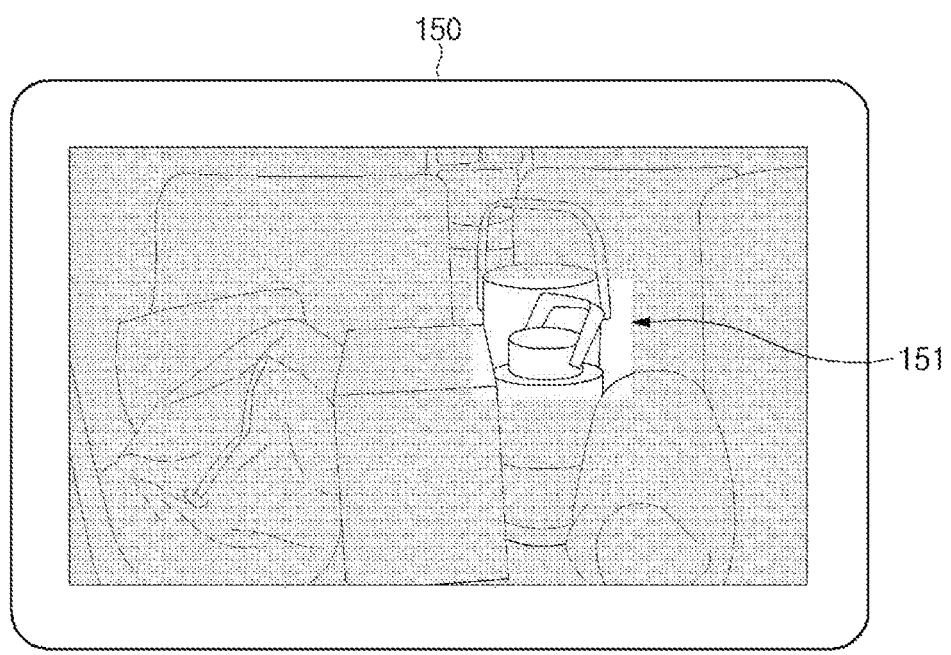

FIG. 2 is a flowchart illustrating a vehicle status management method according to an exemplary embodiment of the present disclosure, and FIGS. 3A and 3B are exemplary views illustrating examples of displaying an image of an object storage compartment of a vehicle according to an exemplary embodiment of the present disclosure.

Referring to FIG. 2, the controller 160 obtains a first image by photographing the inside of the object storage compartment of the vehicle through the camera 120 (S110). The controller 160 obtains the first image by photographing the inside of the object storage compartment by operating the camera 120 before detecting, through the sound detector 110, a sound generated in the object storage compartment of the vehicle. At this time, the controller 160 may store, in the memory 140, the first image obtained by the camera 120.

The controller 160 detects, through the sound detector 110, a sound generated in the object storage compartment (S120). The controller 160 may detect the sound generated in the object storage compartment, through one or more microphones disposed in the object storage compartment.

When the sound generated in the object storage compartment is detected, the controller 160 obtains a second image by photographing the inside of the object storage compartment using the camera 120 (S130). That is, the controller 160 takes an image of the inside of the object storage compartment through the camera 120 after the sound generated in the object storage compartment is detected.

The controller 160 analyzes a cause area where the sound is generated in the object storage compartment, by comparing the first image and the second image (S140).

The controller 160 controls the display 150 to highlight the cause area in the second image (the obtained image of the inside of the object storage compartment) (S150). For example, as illustrated in FIG. 3A, the controller 160 may enlarge an identified cause area 151 in the second image and may display an enlarged cause area 152. At this time, the controller 160 may display, in a box form, the identified cause area 151 in the second image. Alternatively, as illustrated in FIG. 3B, the controller 160 may blur the remaining area other than the cause area 151 in the second image and may display the blurred area and the cause area 151 on the display 150.

Figure 4:
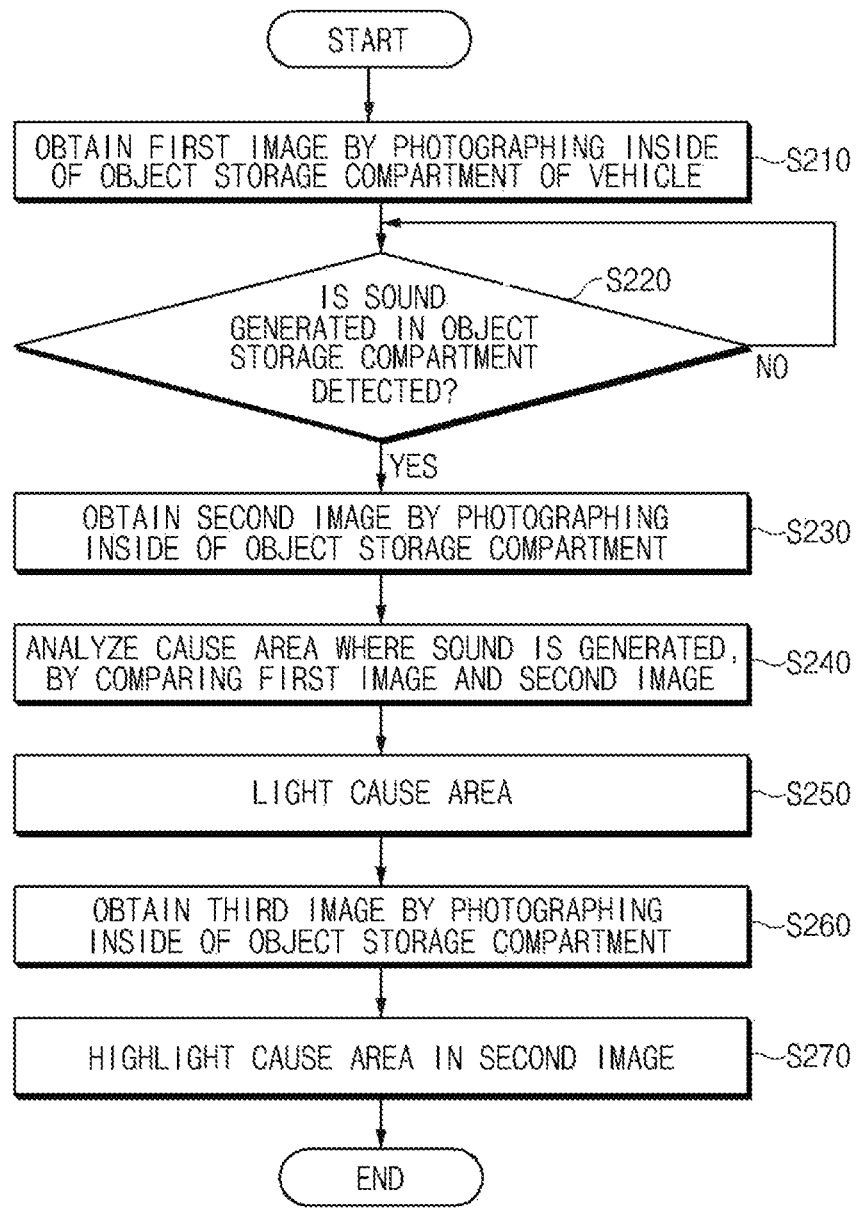
FIG. 4 is a flowchart illustrating a vehicle status management method according to another exemplary embodiment of the present disclosure.
Figure 5A:
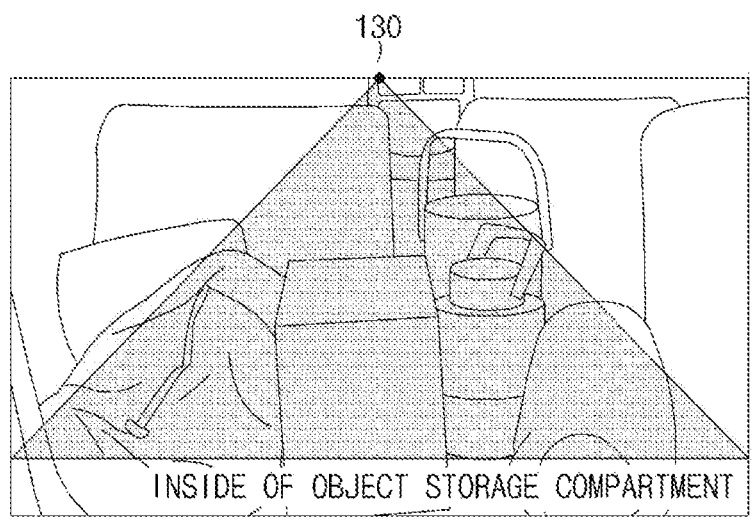
FIGS. 5A and 5B are exemplary views illustrating examples of controlling lighting according to another exemplary embodiment of the present disclosure.
Figure 5B:
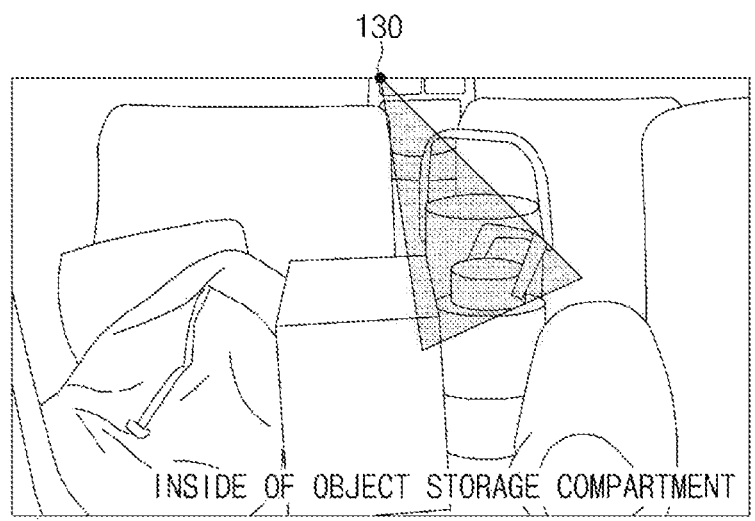

FIG. 4 is a flowchart illustrating a vehicle status management method according to another exemplary embodiment of the present disclosure, and FIGS. 5A and 5B are exemplary views illustrating examples of controlling lighting according to another exemplary embodiment of the present disclosure.

Referring to FIG. 4, the controller 160 obtains a first image by photographing the inside of an object storage compartment of a vehicle (S210). The controller 160 obtains the image of the inside of the object storage compartment, that is, the first image through the camera 120 before detecting, through the sound detector 110, a sound generated in the object storage compartment of the vehicle.

The controller 160 detects, through the sound detector 110, a sound generated in the object storage compartment (S220). The controller 160 may detect the sound generated in the object storage compartment, through one or more microphones disposed in the object storage compartment.

When the sound generated in the object storage compartment is detected, the controller 160 obtains a second image by photographing the inside of the object storage compartment (S230). The controller 160 obtains the image of the inside of the object storage compartment, that is, the second image through the camera 120 after the sound is detected by the sound detector 110.

The controller 160 analyzes a cause area where the sound is generated in the object storage compartment, by comparing the first image and the second image (S240). In other words, the controller 160 estimates (finds) the place where the sound is generated in the object storage compartment, by comparing the two images.

The controller 160 controls the lighting device 130 to light the cause area (S250). The controller 160 controls the lighting device 130 to adjust a lighting direction and/or a lighting range. For example, the lighting device 130 may adjust the lighting direction and the lighting range to entirely light the inside of the object storage compartment, as illustrated in FIG. 5A, when no sound is detected and to light only the cause area, as illustrated in FIG. 5B, according to the control of the controller 160 when the sound is detected.

The controller 160 obtains a third image by photographing the inside of the object storage compartment through the camera 120 in the state in which the lighting device 130 lights the cause area (S260). The controller 160 outputs the obtained third image on the display 150 (S270). At this time, the controller 160 may control the display 150 to highlight the cause area in the third image.

Figure 6:
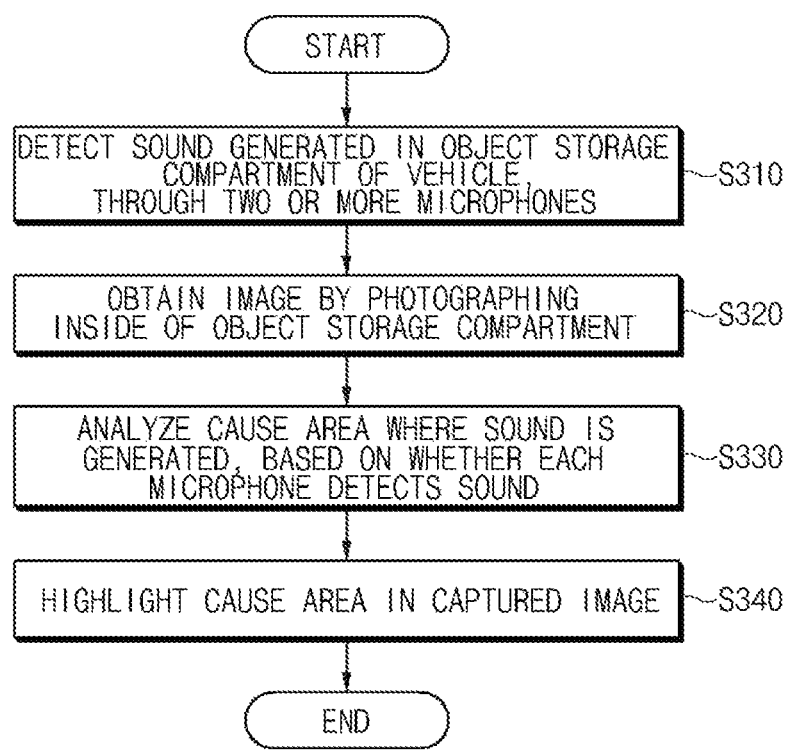
FIG. 6 is a flowchart illustrating a vehicle status management method according to another exemplary embodiment of the present disclosure.

FIG. 6 is a flowchart illustrating a vehicle status management method according to another exemplary embodiment of the present disclosure.

Referring to FIG. 6, the controller 160 detects, through two or more microphones, a sound generated in an object storage compartment of a vehicle (S310). The two or more microphones are disposed at different positions in the object storage compartment.

When the sound generated in the object storage compartment is detected, the controller 160 obtains an image by photographing the inside of the object storage compartment by operating the camera 120 (S320).

The controller 160 analyzes a cause area where the sound is generated, based on whether each of the microphones detects a sound (S330). The controller 160 may determine an area closest to a microphone that detects a sound, as the cause area. The controller 160 may determine the cause area where the sound is generated, in consideration of the intensity of a sound detected through each microphone.

The controller 160 highlights the cause area in the captured image on the display 150 (S340). The controller 160 may enlarge and display an area corresponding to the cause area in the captured image of the inside of the object storage compartment, or may display only the enlarged cause area.

Figure 7:
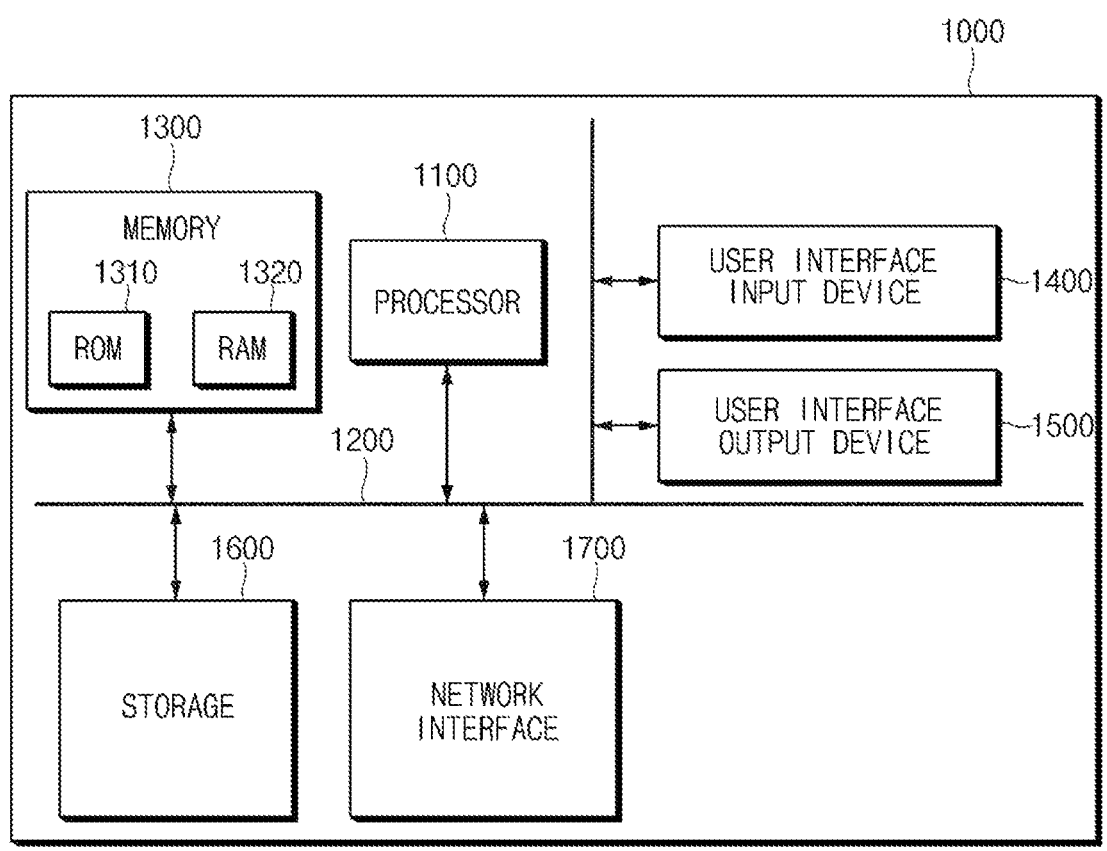
FIG. 7 is a block diagram illustrating a computing system for executing a vehicle status management method according to an exemplary embodiment of the present disclosure.

FIG. 7 is a block diagram illustrating a computing system for executing a vehicle status management method according to an exemplary embodiment of the present disclosure.

Referring to FIG. 7, the computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the present disclosure, the vehicle status management apparatus and method photograph and display the inside of the object storage compartment of the vehicle when a sound is generated in the object storage compartment of the vehicle, thereby enabling a user to identify a cause of the sound generated in the object storage compartment, without opening the object storage compartment of the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle status management apparatus comprising:
a sound detector disposed in an object storage compartment of a vehicle and configured to detect a sound generated in the object storage compartment;
a camera configured to obtain an image by photographing an inside of the object storage compartment;
a display disposed in the vehicle; and
a controller configured to control the display to output the image of the inside of the object storage compartment which is obtained through the camera when the sound is detected,
wherein the controller receives a first image obtained before the detection of the sound and a second image obtained after the detection of the sound from the camera, analyzes a cause area where the sound is generated by comparing the first image and the second image, and controls the display to highlight the cause area in the obtained image of the inside of the object storage compartment.

2. The vehicle status management apparatus of claim 1, wherein the controller controls the display to enlarge and display the cause area in the obtained image of the inside of the object storage compartment.

3. The vehicle status management apparatus of claim 1, wherein the controller controls the display to blur a remaining area other than the cause area in the obtained image of the inside of the object storage compartment.

4. The vehicle status management apparatus of claim 1, further comprising a lighting device disposed in the object storage compartment,
wherein the controller controls the lighting device to adjust a lighting direction or a lighting range to light only the cause area.

5. The vehicle status management apparatus of claim 1, wherein the sound detector includes a plurality of microphones, and
wherein the controller analyzes a cause area where the sound is generated based on whether each of the plurality of microphones detects the sound.

6. The vehicle status management apparatus of claim 5, wherein the controller determines an area adjacent to a position of a microphone that detects the sound among the plurality of microphones as the cause area.

7. The vehicle status management apparatus of claim 6, wherein the controller controls a photographing direction of the camera to be directed toward the cause area.

8. The vehicle status management apparatus of claim 5, wherein the controller analyzes the cause area where the sound is generated in consideration of an intensity of the sound detected through each of the plurality of microphones.

9. A vehicle status management method comprising:
detecting a sound generated in an object storage compartment of a vehicle;
obtaining an image of an inside of the object storage compartment; and
controlling displaying of the image obtained by photographing the inside of the object storage compartment,
wherein the obtaining of the image of the inside of the object storage compartment includes:
obtaining a first image by photographing the inside of the object storage compartment before the detection of the sound;
obtaining a second image by photographing the inside of the object storage compartment after the detection of the sound;
analyzing a cause area where the sound is generated in the object storage compartment, by comparing the first image and the second image; and
controlling the cause area to be highlighted in the obtained image.

10. The vehicle status management method of claim 9, wherein the controlling of the cause area to be highlighted includes controlling the cause area to be enlarged and displayed in the obtained image.

11. The vehicle status management method of claim 9, wherein the controlling of the cause area to be highlighted includes controlling a remaining area other than the cause area to be blurred and displayed in the obtained image.

12. The vehicle status management method of claim 9, further comprising:
controlling a lighting direction to be directed toward the cause area, after the analyzing of the cause area; and
obtaining a third image by photographing the inside of the object storage compartment after the controlling of the lighting direction.

13. The vehicle status management method of claim 9, wherein the detecting of the sound includes detecting sounds through a plurality of microphones disposed at different positions in the object storage compartment.

14. The vehicle status management method of claim 13, wherein the controlling of displaying the obtained image includes:
analyzing a cause area where the sound is generated in the object storage compartment based on whether each of the plurality of microphones detects the sound; and
controlling the cause area to be highlighted in the obtained image.

15. The vehicle status management method of claim 14, wherein the analyzing of the cause area includes determining an area adjacent to a position of a microphone that detects the sound among the plurality of microphones as the cause area.

16. The vehicle status management method of claim 14, further comprising controlling a photographing direction of a camera to be directed toward the cause area after the analyzing of the cause area.

* * * * *